United States Patent

Bunting

[15] 3,688,960

[45] Sept. 5, 1972

[54] CONTROL DEVICE FOR PROJECTOR FILM STRIPPING AND THREADING MECHANISM

[72] Inventor: Leslie J. Bunting, Rochester, N.Y.
[73] Assignee: Eastman Kodak Company, Rochester, N.Y.
[22] Filed: May 3, 1971
[21] Appl. No.: 139,530

[52] U.S. Cl. .................. 226/91, 242/192, 242/209, 352/158
[51] Int. Cl. .............................................. G03b 1/58
[58] Field of Search ........... 226/91, 89, 92; 352/158; 242/192, 209

[56] References Cited

UNITED STATES PATENTS 3,558,028  1/1971  Bunting .................... 226/091

Primary Examiner—Richard A. Schacher
Assistant Examiner—Gene A. Church
Attorney—W. H. J. Kline and Milton S. Sales

[57] ABSTRACT

A self-threading motion picture projector includes a control device which, upon manually depressing a control lever, latches a film stripping and threading mechanism of the projector in its active position wherein it is effective to feed film from a roll of film supported by the projector. When the leading end of the film has entered a film gate of the projector and has been engaged by a film-advancing member (which advances the film at a rate faster than the film feeding mechanism), the control device is unlatched in response to the resulting tension of the film between the gate and the supply reel, thereby causing the stripping and threading mechanism to return to its inactive position so that the film can be projected. In the event that the control lever is momentarily depressed by the operator and then released before the control device has latched the film stripping and threading mechanism in its active position, means are provided for holding the control lever depressed until the mechanism is latched to prevent the mechanism's return to its inactive position before the film is fed from a supported roll.

6 Claims, 4 Drawing Figures

LESLIE J. BUNTING
INVENTOR.

ATTORNEYS

CONTROL DEVICE FOR PROJECTOR FILM STRIPPING AND THREADING MECHANISM

BACKGROUND OF THE INVENTION

1. Field of the Invention

The present invention relates to self-threading motion picture projectors of the type disclosed in my commonly assigned U.S Pat. No. 3,558,028, entitled "Control Device for Self-Threading Motion Picture Projector," the disclosure of such patent being hereby incorporated into this disclosure. More particularly, the invention relates to the provision of such a projector with an improved control device which eliminates the need for the operator to move than momentarily depress a control lever in order to activate the film stripping and threading mechanism (also known as the film feeding mechanism).

2. Description of the Prior Art

The film stripping and threading mechanism for motion picture projectors as disclosed in my above-identified patent includes a drive member which is movable upon the manual depression of an operating member to an active position at which a longitudinally movable endless belt is in peripheral engagement with a roll of film wound onto a supply reel, thereby imparting unwinding rotation to that roll. A stripper finger is also moved into peripheral engagement with the film roll to separate the leading end of the film from the roll and to guide it along a predetermined threading path partially defined between the stripper finger and the belt. By this means, the leading end of the film is caused to enter a film gate of the projector, where it is engaged by a pull-down claw or other equivalent film-advancing member which thereupon advances it intermittently through the film gate.

A latch mechanism retains the drive member and the stripper finger in their respective active positions in engagement with the roll until the latch member is released in response to the resulting tensioning of the film between the gate and the film supply reel upon completion of the film feeding operation. Release of the latch mechanism permits the drive member and the stripper finger to be moved out of engagement with the film roll. Additionally, the latch member can be released manually at any time by means of the same operating member employed to initiate the film threading operation.

In self-threading cartridge-loaded motion picture projectors of this type, the latch mechanism which retains the film stripping and threading mechanism in its active position is not immediately engaged. Therefore, if the operator releases the operating member before such engagement, the mechanism will return to its inactive position before the leading end of the roll of film is withdrawn from a supported reel. While the control member can be again depressed for a longer time, this may cause confusion in cases where the operator is unfamiliar with the projector and has not carefully read the instruction manual.

SUMMARY OF THE INVENTION

It is an object of the present invention to insure latching of a film stripping and threading mechanism in the above-described type of projector in its active position when the operator actuates the mechanism even momentarily.

In accordance with the above object, I have provided a simple and reliable control device adapted to be incorporated in the above-described type of projector wherein in response to even momentary manual movement of an operating member, the film stripping and threading mechanism is moved to its active position where it is releasably retained in engagement with the film roll by a latch member of a control device.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
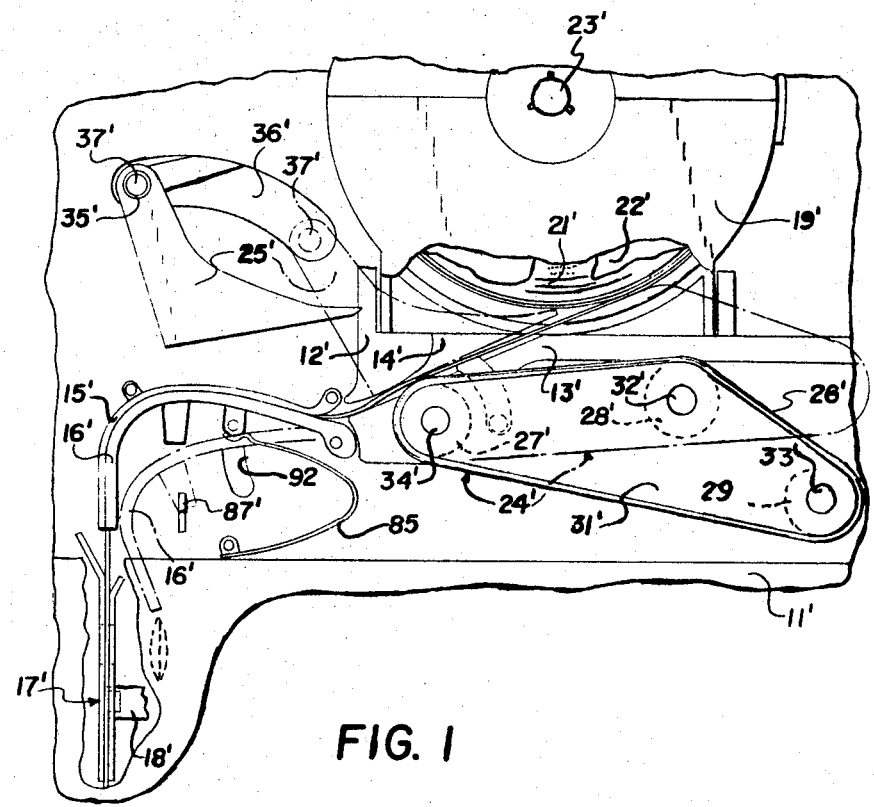
FIG. 1 is a side elevational view of a portion of a self-threading motion picture projector incorporating a preferred embodiment of the present invention.

The projector partially illustrated in the accompanying drawings may be basically the same as the one described more specifically in my above-identified U.S. Pat. No. 3,558,028, but omits various components of the previously disclosed machine which do not relate directly to understanding the present invention. It will be understood, however, that such components are completely compatible with the subject control device and have been deleted from the present disclosure only for the purposes of clarity. Some of the elements shown in the accompanying drawings are identical to corresponding elements in the patent, and these elements have been referred to by the same reference numerals as were used in the patent. These numerals have been identified in the present application by the placement of a prime mark adjacent thereto. Other elements shown in the accompanying drawings correspond generally to elements shown in the patent but have been modified to varying extents. These modified elements have been given the same reference numerals as were used in the patent but without a prime mark. Certain other features of the present invention do not have corresponding parts in the patent, and these elements have been referred to by reference numerals followed by the suffix *a*.

Briefly referring to FIG. 1, the illustrative projector comprises a frame plate 11' that may be disposed in a vertical plane and which includes film guide bosses 12′ and 13′ which define a film guide channel 14′ leading into a film passageway defined between a stationary guide show 15′ and a pivotal guide show 16′. The lower end of the film passageway defined between the two guide shoes is located directly above a generally conventional film gate 17′ provided with a film-advancing member depicted by a pull-down claw 18′. As shown at numeral 19′, the projector is adapted to be loaded with a film cartridge releasably attached to frame plate 11′. Within the cartridge, a roll of film 21′ is wound onto a film supply reel 22′, which is supported for rotation by a rotatable spindle 23′.

When the film cartridge is initially mounted on the projector, the leading end of the film is separated from the film roll and fed along the guide path defined by the film guide bosses and the guide shoes in order that it will enter the film gate and will be engaged by the film pull-down claw, which thereafter drives the film automatically into engagement with the hub of a film take-up reel, not shown. As previously mentioned, the feeding of film to the gate is performed by a film stripping and threading mechanism comprising a drive member 24′ and a stripper finger 25′. Both the drive member and the stripper finger are described in detail in U.S. Pat. No. 3,558,028.

Drive member 24′ comprises an endless elastic belt 26′ of circular cross section encircling three pulleys 27′, 28′ and 29′ supported in coplanar relation to one another between two parallel pulley support plates, one of which is shown at 31′ in FIG. 1. Pulleys 28′ and 29′ are freely rotatable about their respective pivot studs 32′ and 33′ extending between the two support plates. Pulley 27′, however, is supported by a drive shaft 34′, which is constantly driven by appropriate drive means, not shown, thereby causing that pulley to rotate constantly in a counterclockwise direction as viewed in FIG. 1. The two pulley support plates are journalled to the drive shaft adjacent opposite faces of pulley 27′ and thereby allow the drive member to pivot between its inactive position shown in solid lines in FIG. 1 and an active position at which its moving belt 26′ is in pivotal engagement with the roll of film on reel 22′, as shown in broken lines in that same figure. Accordingly, when the drive member is moved to its active position, it imparts unwinding rotation to the film roll as described in the aforementioned patent.

Stripper finger 25′ is pivotally supported by a sleeve member 35′ extending through an elongate slot 36′ in frame plate 11′. The sleeve member in turn is supported by a pin 37′ on a stripper arm as explained in the aforementioned patent. In operation, the film roll is rotated in an unwinding direction by belt 26′ and the film roll is engaged by the stripper finger so that the leading end of the film engages the finger and is thereby separated from the roll and delivered along the threading path.

Figure 2:
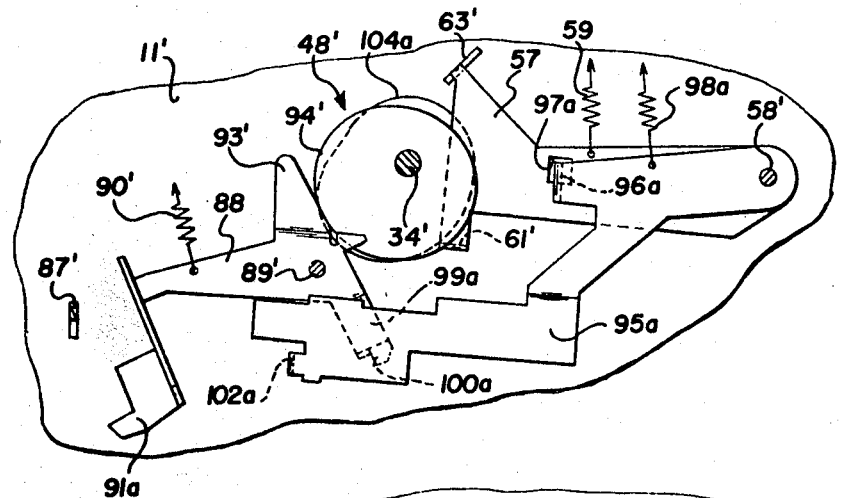
FIG. 2 is an elevational view of a portion of the projector shown in FIG. 1, taken from inside the projector to show the arrangement of internally located components of the film stripping and threading mechanism in association with a control device according to the present invention.
Figure 3:
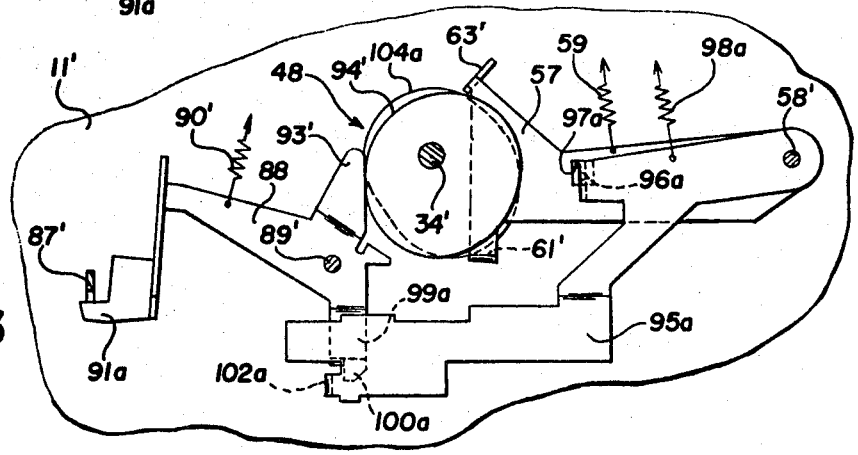
FIG. 3 is a view from the same viewpoint as FIG. 2, depicting the relative positions assumed by the various illustrated elements of the film stripping and threading mechanism and of the subject control device during movement of the film stripping and threading mechanism toward its active position.
Figure 4:
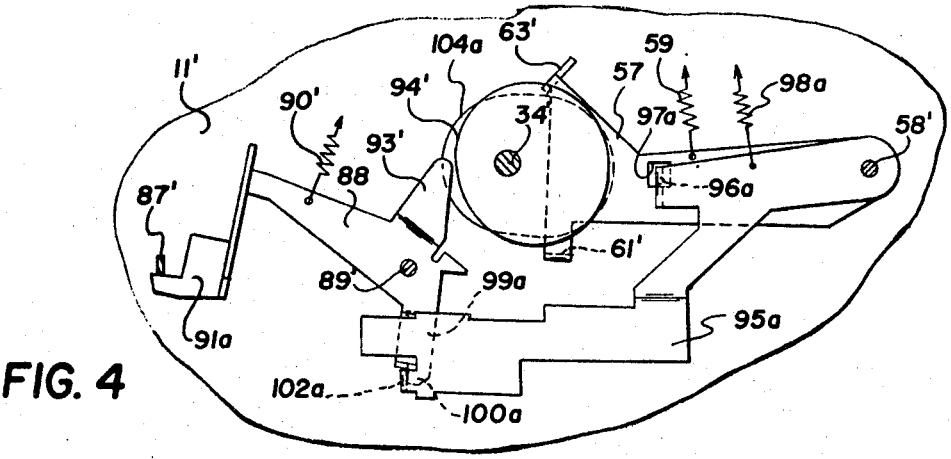
FIG. 4 is a view similar to FIG. 3 and shows the relative positions of the illustrated elements when the film stripping and threading mechanism is latched in its active position.

Referring now to FIGS. 2-4, the mechanism employed to move the stripper member and the drive member subsequently into engagement with the film roll comprises a cam member 48′ rotatably supported on drive shaft 34′ between frame plate 11′ and a carrier plate, not shown. A pair of cam lobes for controlling movement of the drive member and the stripper finger have been omitted from the drawings, but can be seen by reference to the aforementioned patent. A clutch operating means includes a lever 57 pivotally mounted on the carrier plate by a pin 58′ and biased upwardly (clockwise) by a spring 59. A pair of ears 61′ and 63′ on lever 57 control a clutch member, not shown, in a manner fully described in U.S. Pat. No. 3,558,028 to selectively couple cam member 48′ to drive shaft 34′ to rotate the cam member between an initial position shown in FIG. 2 and an intermediate position shown in FIG. 4. Upon rotation of lever 57 in a counterclockwise direction from its position shown in FIG. 2, cam member 48′ is coupled to shaft 34′ to rotate the cam member through an angle of approximately 120° whereupon the the cam member is again immobilized at its intermediate position. Thereafter, movement of lever 57 back to its former position similarly causes the cam member to be driven through an angle of approximately 240° to restore it to its initial position.

As explained in the aforementioned patent, during the projection of the film, guide shoe 16′ (FIG. 1) between supply reel 22′ and gate 17′ is free to pivot downwardly against the influence of a relatively weak leaf spring 85′ to absorb momentary fluctuations in the film tension. The trailing end of the film is attached to film supply reel 22′ so that the film is drawn taunt between the gate and that reel when all of the available film has been displayed. When this occurs, the lower guide shoe is pivoted to its lowermost position shown in broken lines in FIG. 1 so that its foot member engages and depresses a trigger member 87′ to initiate the rewinding of the film by effecting automatic adjustment of a rewind mechanism, not shown, which opens the film gate and imparts film rewinding rotation to the film supply reel. During the film stripping and threading operation, however, the lower guide show must be retained in its raised position with greater force than that afforded by spring 85′ in order to insure that the leading end of the filmstrip will be guided positively into the film gate. This is accomplished in the apparatus according to the present invention by means of a snubber arm 88 which is biased upwardly about a pivot pin 89′ by a spring 90′ to urge a shoe 91a on the arm toward engagement with the lower edge of trigger member 87′. A cam follower ear 93′ on arm 88 is adapted to engage a lobe 94′ on cam member 48′, holding the arm in its inactive position as shown in FIG. 2 whenever the cam member is in its initial position. As the cam member rotates to its FIG. 4 on intermediate position, as previously described, the decreased radius of the portion of cam lobe 94′ adjacent cam follower ear 93′ allows spring 90′ to pivot arm 88 upwardly until shoe 91a contacts the lower edge of trigger member 87′ so that the lower guide shoe must overcome the combined force of springs 85′ and 90′ to depress trigger member 87′.

The position of lever 57 is established by an operating lever 95a which is pivotally mounted on the carrier plate by pin 58′ and forms another part of the clutch-operating means. A tab 96a on operating lever 95a passes through an opening 97a in lever 57 so that by manually moving operating lever 95a downwardly against the force of a spring 98a, lever 57 is moved from its position shown in FIG. 2 to its position shown in FIG. 3 to initiate the film stripping and threading operation by initiating rotation of the cam member from its initial position (FIG. 2) to its intermediate position (FIG. 4).

Snubber arm 88 carries a latching arm 99a with a bent tab 100a. Operating lever 95a also has a bent tab 102a. When the operator manually depresses operating lever 95a, lever 57 is pivoted downwardly, as previously explained, thereby initiating rotation of the cam member to its intermediate position. As rotation proceeds, cam lobe 94' begins to allow spring 90' to pivot snubber arm 88 toward the position shown in FIG. 4 as also explained above, and in so doing moves latching arm 99a to the position illustrated in that same figure so that tab 100a engages tab 102a of the operating lever and the engagement between parts 95a and 99a and the forces exerted by springs 59, 98a and 90' holds operating lever 95a and lever 57 latched in their lower position in opposition to springs 59 and 98a. Thus, as soon as such engagement of tabs 100a and 102a has been established, the operator can release operating lever 95a without interrupting the continuing performance of the film stripping and threading operation.

According to the present invention, I have provided a mechanism which permits the operator to place the projector in its film stripping and threading mode (film feeding mode) by only momentarily depressing operating lever 95a by insuring that once lever 57 is pivoted downwardly (counterclockwise) to initiate rotation of the cam member toward its intermediate, FIG. 4 position, that lever will not return to its raised position even if released before latching arm 99a has moved to the position illustrated in FIG. 4 to engage tabs 100a and 102a. In order to accomplish this, I have provided another cam lobe 104a on shaft 34' of cam member 48' between cam lobe 94' and plate 11'. Cam lobe 104a is positioned along shaft 34' to contact the upper surface of ear 61' on lever 57. As soon as the operator manually depresses operating lever 95a to initiate rotation of the cam member toward its intermediate position, cam lobe 104a presents an increasingly larger radius to ear 61', thereby preventing the return of lever 57 to its initial position. As rotation of cam member 48' proceeds, latching arm 99a moves to engage tab 102a as depicted in FIG. 3 and as explained above. As soon as the latching mechanism has engaged, cam lobe 104a begins to present a decreasing radius to ear 61' so that when the projector elements have reached their intermediate position as shown in FIG. 4, lever 57 will be free to return to its initial, FIG. 1 position when the latch mechanism is released.

When the completion of the film stripping and threading operation has brought the leading end of the film into contact with pull-down claw 18', the longitudinal movement imparted to the film by the claw exceeds the rate at which the film can be unwound from the film roll by engagement of the slower moving drive belt with the film. Therefore, sufficient tension is developed in the film between gate 17' and supply reel 22' to depress trigger member 87' by overpowering springs 85' and 90'. Before trigger member 87' is moved to the position at which it initiates the film-rewinding operation of the projector, the accompanying rotation of snubber arm 88 displaces latching arm 99a to disengage tab 100a from tab 102a; thereby allowing springs 59 and 98a to raise operating lever 95a and lever 57 so that the cam member will return to its initial, FIG. 2 position by completing a single revolution. Therefore, the illustrated mechanism is restored automatically to the condition depicted in FIG. 2 allow the projection of the film to proceed. Provision may be made for manually depressing trigger member 87' to enable the operator to discontinue the film stripping and threading operation at any time.

The invention has been described in detail with particular reference to a preferred embodiment thereof, but it will be understood that variations and modifications can be effected within the spirit and scope of the invention.

I claim:

1. In a control device for apparatus having (1) means for supporting a supply roll of web material comprising an elongated strip of web material having a leading end, (2) a stripping and threading mechanism adjustable to an active condition for feeding the leading end of the web material from a supported supply roll and to an inactive condition, (3) operating means movable to a first position and to a second position for adjusting said stripping and threading mechanism respectively to its inactive and active conditions, (4) resilient means for biasing said operating means toward said first position, and (5) means engageable for releasably latching said operating means in said second position when said stripping and threading mechanism is adjusted to said active condition; the improvement comprising means operable upon movement of said operating means away from said first position toward said second position for holding said operating means in said second position until said latching means is engaged.

2. The improvement as defined in claim 1 wherein said holding means includes means permitting movement of said operating means away from said second position to said first position upon disengagement of said latching means.

3. In a control device for a motion picture projector of the type having (1) means for supporting a film supply roll comprising an elongate strip of film having a leading end, (2) a stripping and threading mechanism adjustable to an active condition for feeding the leading end of the film from a supported supply roll and to an active condition, (3) a rotating drive shaft, (4) a cam member, (5) clutch-operating means coupled to the shaft and to the cam member and movable between a first position and a second position for effecting movement of said cam member by said drive shaft to predetermined initial and intermediate locations corresponding respectively to said first and second positions of said clutch-operating means, (6) first control means operated by said cam member for adjusting said stripping and threading mechanism to said first condition in response to movement of said cam member to said intermediate location, and (7) a latch member movable into operative latching engagement with said clutch-operating means at said second position thereof in response to movement of said cam member from said initial location to said intermediate location to releasably retain said clutch-operating means in said second position; the improvement comprising second control means operated by said cam member upon movement of said cam member away from said initial location toward said intermediate location for holding said clutch-operating means at said second position thereof until said latch is moved into engagement with said clutch-operating means.

4. The improvement as defined in claim 3 wherein said cam member comprises:
   a first cam lobe operatively associated with said latch member for moving said latch member into operative latching engagement with said clutch-operating means; and
   a second cam lobe operatively associated with said clutch-operating means for holding said clutch-operating means at said second position thereof.

5. The improvement as defined in claim 4 wherein said second cam lobe is shaped to permit movement of said clutch-operating means to its first position upon disengagement of said latch member.

6. The improvement as defined in claim 5 wherein said cam member is rotatable concentrically with said drive shaft.

* * * * *